(12) United States Patent
Dawson et al.

(10) Patent No.: US 9,147,192 B2
(45) Date of Patent: Sep. 29, 2015

(54) TARGETED VEHICLE ADVERTISING AND ENTERTAINMENT SYSTEM METHOD

(75) Inventors: Christopher James Dawson, Arlington, VA (US); Peter George Finn, Brampton (CA); Stephen James Houlihan, Burke, VA (US); James Wesley Seaman, Falls Church, VA (US)

(73) Assignee: International Business Machines Corporation, Armonk, NY (US)

( * ) Notice: Subject to any disclaimer, the term of this patent is extended or adjusted under 35 U.S.C. 154(b) by 1379 days.

(21) Appl. No.: 12/353,711

(22) Filed: Jan. 14, 2009

(65) Prior Publication Data

US 2010/0179878 A1    Jul. 15, 2010

(51) Int. Cl.
G06Q 30/00        (2012.01)
G06Q 30/02        (2012.01)

(52) U.S. Cl.
CPC ............ *G06Q 30/00* (2013.01); *G06Q 30/0265* (2013.01); *G06Q 30/0266* (2013.01)

(58) Field of Classification Search
CPC .......... G06Q 30/0251; G06Q 30/0265; G06Q 30/0266
USPC .......................................................... 705/14
See application file for complete search history.

(56) References Cited

U.S. PATENT DOCUMENTS

| | | | | |
|---|---|---|---|---|
| 5,238,281 A * | 8/1993 | Chen | | 296/21 |
| 6,145,230 A * | 11/2000 | Holmberg | | 40/591 |
| 6,545,596 B1 | 4/2003 | Moon | | |
| 6,898,517 B1 * | 5/2005 | Froeberg | | 701/468 |
| 6,922,138 B2 | 7/2005 | Melvin | | |
| 7,027,801 B1 | 4/2006 | Hall et al. | | |
| 7,287,349 B1 * | 10/2007 | MacDonald et al. | | 40/591 |
| 7,812,711 B2 * | 10/2010 | Brown et al. | | 340/426.18 |
| 2002/0167416 A1 * | 11/2002 | Polyakov | | 340/691.6 |
| 2003/0233275 A1 * | 12/2003 | Melvin | | 705/14 |
| 2004/0231208 A1 * | 11/2004 | Pitt | | 40/590 |
| 2004/0267617 A1 * | 12/2004 | Yanase | | 705/14 |
| 2005/0012598 A1 * | 1/2005 | Berquist | | 340/425.5 |
| 2006/0085208 A1 * | 4/2006 | Nelson et al. | | 705/1 |
| 2006/0176289 A1 * | 8/2006 | Horn | | 345/204 |
| 2007/0118423 A1 * | 5/2007 | Always | | 705/14 |

(Continued)

FOREIGN PATENT DOCUMENTS

WO    WO 00/49541 A2    8/2000

*Primary Examiner* — Matthew L Hamilton
(74) *Attorney, Agent, or Firm* — Schmeiser, Olsen & Watts, LLP; Mark C. Vallone

(57) ABSTRACT

In accordance with an aspect of the present invention, a system may be used with a first database, a second database and a global positioning system, wherein the first database has advertising content data and advertising correlation data stored therein, wherein the second database has identifying data and correlation data stored therein and wherein the global positioning system is operable to provide a position signal corresponding to a position of the system and the velocity of the system. The system includes a sensor portion, a processor portion and a display portion. The sensor portion is operable to detect a parameter and to generate a detected signal based on the detected parameter. The processor portion is operable to generate a correlation between the detected signal and a portion of the identifying data, to obtain a portion of the advertising content data based on a portion of the correlation data and the advertising correlation data, and to generate a display signal based on the advertising content data and the position signal. The display portion is operable to display data based on the display signal.

20 Claims, 5 Drawing Sheets

(56) References Cited

U.S. PATENT DOCUMENTS

| | | | |
|---|---|---|---|
| 2007/0208681 A1* | 9/2007 | Bucholz | 706/47 |
| 2008/0030427 A1* | 2/2008 | Lanham | 345/2.3 |
| 2008/0089288 A1* | 4/2008 | Anschutz et al. | 370/331 |
| 2008/0134553 A1* | 6/2008 | Zewald | 40/590 |
| 2008/0236003 A1* | 10/2008 | Raccah | 40/466 |
| 2008/0236007 A1* | 10/2008 | Au et al. | 40/592 |
| 2008/0294520 A1* | 11/2008 | Power et al. | 705/14 |
| 2009/0037273 A1* | 2/2009 | Zhu | 705/14 |
| 2009/0076915 A1* | 3/2009 | Tighe | 705/14 |
| 2009/0113775 A1* | 5/2009 | Netter | 40/591 |
| 2009/0150242 A1* | 6/2009 | Del Cogliano | 705/14 |
| 2010/0036717 A1* | 2/2010 | Trest | 705/14.1 |
| 2010/0082569 A1* | 4/2010 | Cresto et al. | 707/705 |
| 2010/0093272 A1* | 4/2010 | Burns | 455/3.06 |
| 2011/0093330 A1* | 4/2011 | Burckart et al. | 705/14.46 |
| 2011/0099075 A1* | 4/2011 | Hannon | 705/14.68 |
| 2012/0303458 A1* | 11/2012 | Schuler, Jr. | 705/14.63 |
| 2014/0257969 A1* | 9/2014 | Topchy et al. | 705/14.42 |

* cited by examiner

TARGETED VEHICLE ADVERTISING AND ENTERTAINMENT SYSTEM METHOD

BACKGROUND

The present invention relates generally to targeted advertising to individuals based on known interests and purchasing history. This is well recognized as a very powerful marketing tool. Many ways of such advertising are in practice today, one of which is placing an advertisement on a vehicle, and having that vehicle traverse a populated route. Individual businesses often practice this advertising method by attaching a magnetic or otherwise attached sign to a business vehicle while it is in operation of the business. Common examples of this include real estate agent vehicles with signs, pizza and food delivery vehicles with signs, and the like. These signs can usually be manually removed and replaced periodically with new signs. Also, some businesses decide to actually paint the advertisement on the vehicle. Another such method employed does not use a corporate vehicle, rather, uses a for-pay vehicle designed to carry such advertising signs. The most common example of this would be a municipal or private bus with one or more advertisements unrelated to the bus service attached to the vehicle for the purposes of advertising.

While these advertising delivery methods do effectively display the advertisements to a relatively large audience, sign content is static and limited to a small amount of space. Additionally, such advertisements can only be targeted in a very broad sense, for example, targeting everyone in a city or section of a city. This lack of targeting makes the advertising ineffective, in that, while many people may see the advertisement, only a small percentage of those people may have any interest in the ad content.

What is needed is a device and method that is a more effective means of mobile advertisement that is capable of targeting consumers with dynamic and custom ad content based on target identifying methods outlined below.

SUMMARY

In accordance with an aspect of the present invention, a system may be used with a first database, a second database and a global positioning system, wherein the first database has advertising content data and advertising correlation data stored therein, wherein the second database has identifying data and correlation data stored therein and wherein the global positioning system is operable to provide a position signal corresponding to a position of the system and the velocity of the system. The system includes a sensor portion, a processor portion and a display portion. The sensor portion is operable to detect a parameter and to generate a detected signal based on the detected parameter. The processor portion is operable to generate a correlation between the detected signal and a portion of the identifying data, to obtain a portion of the advertising content data based on a portion of the correlation data and the advertising correlation data, and to generate a display signal based on the advertising content data and the position signal. The display portion is operable to display data based on the display signal.

Additional features of the invention are set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

DESCRIPTION OF THE SEVERAL VIEWS OF THE DRAWINGS

The accompanying drawing, which is incorporated in and forms a part of the specification, illustrate an exemplary embodiment of the present invention and, together with the description, serve to explain the principles of the invention. In the drawing.

DETAILED DESCRIPTION

Figure 1:
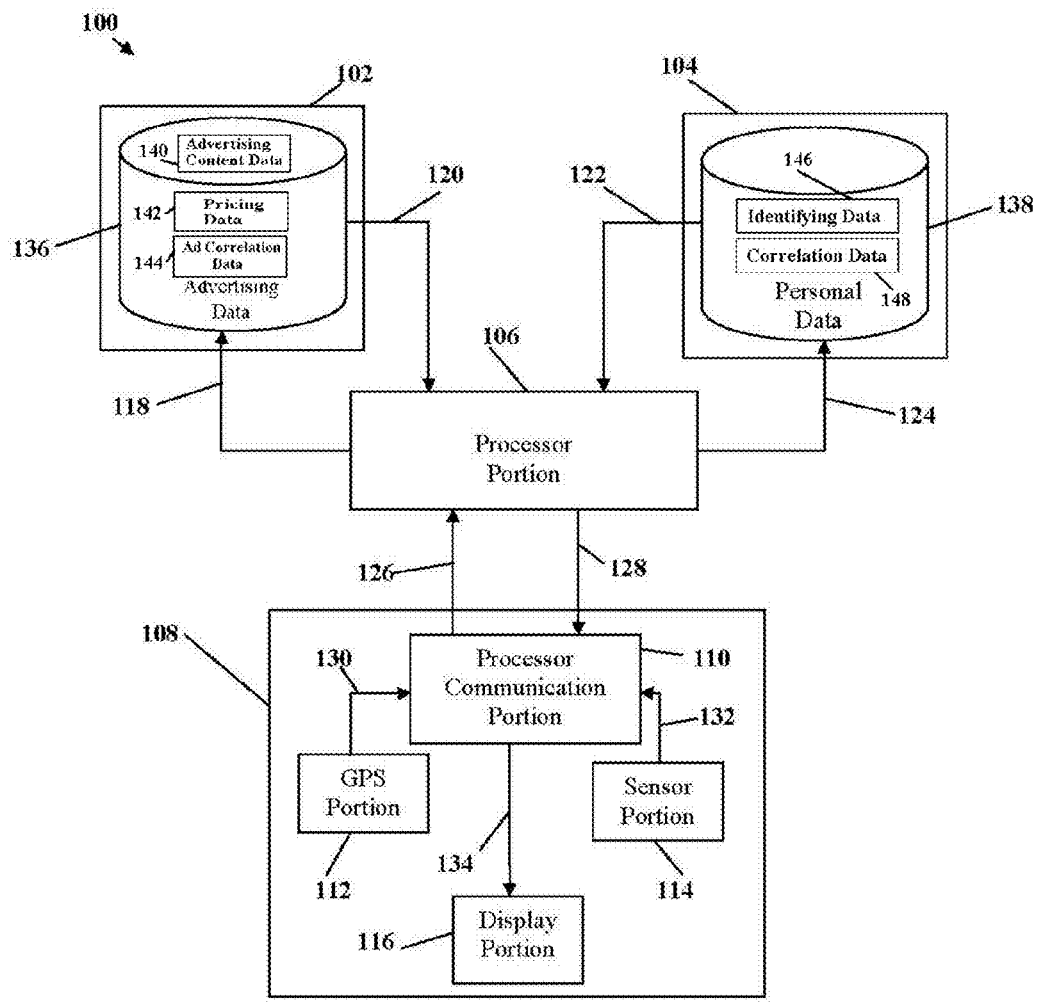
FIG. 1 illustrates an example embodiment of a targeted vehicle advertising and entertainment system in accordance with the present invention.

A vehicle license plate is a unique identifier that enables detection of the owner of the vehicle. In most cases, the owner of the vehicle will also be the current driver of the vehicle. The ability to read a car license plate using a camera is a well known process and is in production on toll-ways, boarder-crossings, traffic control (red-light) cameras, and the like.

In accordance with an aspect of the present invention, a system on a vehicle is operable to identify a specific person, specific persons, a specific type of person or specific types of persons. In accordance with another aspect of the present invention, a system on a vehicle is operable correlate an identified person, identified persons, an identified type of person or identified types of persons with specific advertisements directed to such a person, persons, type of person or types of persons, respectively. In accordance with another aspect of the present invention, a system on a vehicle is operable provide specific advertisements directed to a specific person, specific persons, a specific type of person or specific types of persons, based on a predetermined correlation.

In an example embodiment of a system in accordance with aspects of the present invention, an advertising vehicle is operable to provide advertisements for viewing by people. For example, a system within an advertising vehicle is operable to obtain information to identify a target, such as a person or an object (corresponding to a person as described in more detail below), which is in the vicinity of the advertising vehicle. Based on the obtained information, the system is further operable to correlate the target with specific advertising content and provide the specific advertisements in the form of at least one of images, video and sound.

In some example embodiments of a system in accordance with aspects of the present invention, the target is a person.

In some example embodiments of a system in accordance with aspects of the present invention, the target is a car, which may be used to identify the driver.

An example embodiment of a targeted vehicle advertising and entertainment system in accordance with the present invention will now be described with reference to FIG. 1.

As illustrated in the figure, targeted vehicle advertising and entertainment system 100 includes an advertising database 102, a personal database 104, a processor portion 106, a processor communication portion 110, a global positioning system (GPS) portion 112, a sensor portion 114 and a display portion 116.

Advertising database 102 may be any device, structure or system that is operable to store advertising data 136. Advertising data 136 may include advertisement content data 140, non-limiting examples of which include audio, image or video data. As an example, an advertisement may be from an athletic shoe manufacturer, wherein the advertisement is a video of a person, and wherein in the video the person is running while wearing a particular running shoe of the athletic shoe manufacturer. Advertising data 136 may additionally include pricing data 142 corresponding to advertisement content data 140. For example, pricing data 142 may indicate whether the cost associated with providing a particular advertisement to display portion 116 is based on a fixed cost or a variable cost. A variable cost may be based on the time or place with which an advertisement is provided to display portion 116, as will be described in more detail below. Advertising data 136 may additionally include advertisement correlation data 144 that correlates correlation data 148 from personal content data 138 with advertising data 136. As an example, an entry of correlation data 148 that indicates that a specific person is interested in running shoes may be used in conjunction with advertisement correlation data 144 to identify specific data, within advertisement content data 140, that corresponds to an advertisement for a specific running shoe.

Personal database 104 may be any device, structure or system that is operable to store personal content data 138. Personal content data may include identifying data 146 that corresponds to identifying parameters such as names, phone-numbers, addresses, license plate numbers, vehicle make, vehicle model, etc. Further, personal content data may further include correlation data 148 corresponding to each entry of identifying data 146, wherein correlation data 148 correlates a respective entry of identifying data 146 with particular advertising interests. Personal information and associated advertising interests may be obtained from known sources, a non-limiting example of which includes public records.

GPS portion 112 may be any device, structure or system that is operable to provide a GPS signal 130, which may include position and velocity information of the advertising vehicle. GPS portion 112 may additionally include, or be able to obtain, vendor content data corresponding to locations of vendors, e.g., shops, restaurants, etc., in relationship to the advertising vehicle. This vendor content data may be included in GPS signal 130.

Sensor portion 114 may be any device, structure or system that is operable to obtain target-identifying data based on target parameters, non-limiting target parameters include, vehicle make, vehicle model, license plate number, etc. Sensor portion 114 may also determine target vehicle position and speed relative to the advertising vehicle.

Display portion 116 may be any device, structure or system that is operable to display image data, non-limiting examples of which include a liquid crystal display (LCD), a plasma display, a cathode ray tube (CRT), light emitting diodes (LEDs), organic LEDs (OLEDs), etc. In some embodiments, display portion 116 includes an audio device operable to provide sound based on audio data.

Processor communication portion 110 may be any device, structure or system that is operable to provide information, based on target signal 132 and GPS signal 130, to processor portion 106, and to provide information from processor portion to display portion 116.

Processor portion 106 may be any device, structure or system that is operable to correlate personal content data 138 from personal database 104 with advertising data 136 from advertising database 102. Processor portion 106 may be further operable to identify specific advertising data 136 within personal content data 138 based on the correlation of target signal 132 and GPS signal 130. In some embodiments, processor portion 106 provides a hierarchical ordering of sponsored advertisements based on parameters, non-limiting examples of which include sponsor fee paid, current location, current direction and duration the targeted vehicle is able to view the advertisement, which will be described in more detail below.

In some embodiments, advertising database 102, personal database 104, processor portion 106, processor communication portion 110, GPS portion 112, sensor portion 114 and display portion 116 are a single device. In other embodiments, at least one of advertising database 102, personal database 104, processor portion 106, processor communication portion 110, GPS portion 112, sensor portion 114 and display portion 116 may be a separate device. In the example of FIG. 1, processor communication portion 110, GPS portion 112, sensor portion 114 and display portion 116 are a single device 108, whereas advertising database 102, personal database 104 and processor portion 106 are separate devices.

As illustrated in FIG. 1: advertising database 102 is operable to communicate directly with processor portion 106; personal database 104 is operable to communicate directly with processor portion 106; and processor communication portion 110 is operable to communicate directly with processor portion 106, GPS portion 112, sensor portion 114 and display portion 116. However, in some embodiments intermediate circuitry may be included to transmission between: advertising database 102 and processor portion 106; personal database 104 and processor portion 106; and processor communication portion 110 and processor portion 106, GPS portion 112, sensor portion 114 and display portion 116. Non-limiting examples of intermediate circuitry include matching networks, amplifiers, filters, resistors, etc. As for the communication itself, any known method or system may be used, such as wired or wireless.

Some embodiments include a data processing system program product for executing instructions in a data processing system, wherein the data processing system program product includes a data processing system-readable storage medium having data processing system-readable program code embodied in the medium. Further, in these embodiments, the data processing system-readable program code is operable to instruct the data processing system to perform the functions of advertising database 102, personal database 104, processor portion 106, processor communication portion 110, GPS portion 112, sensor portion 114 and display portion 116.

Figure 2:
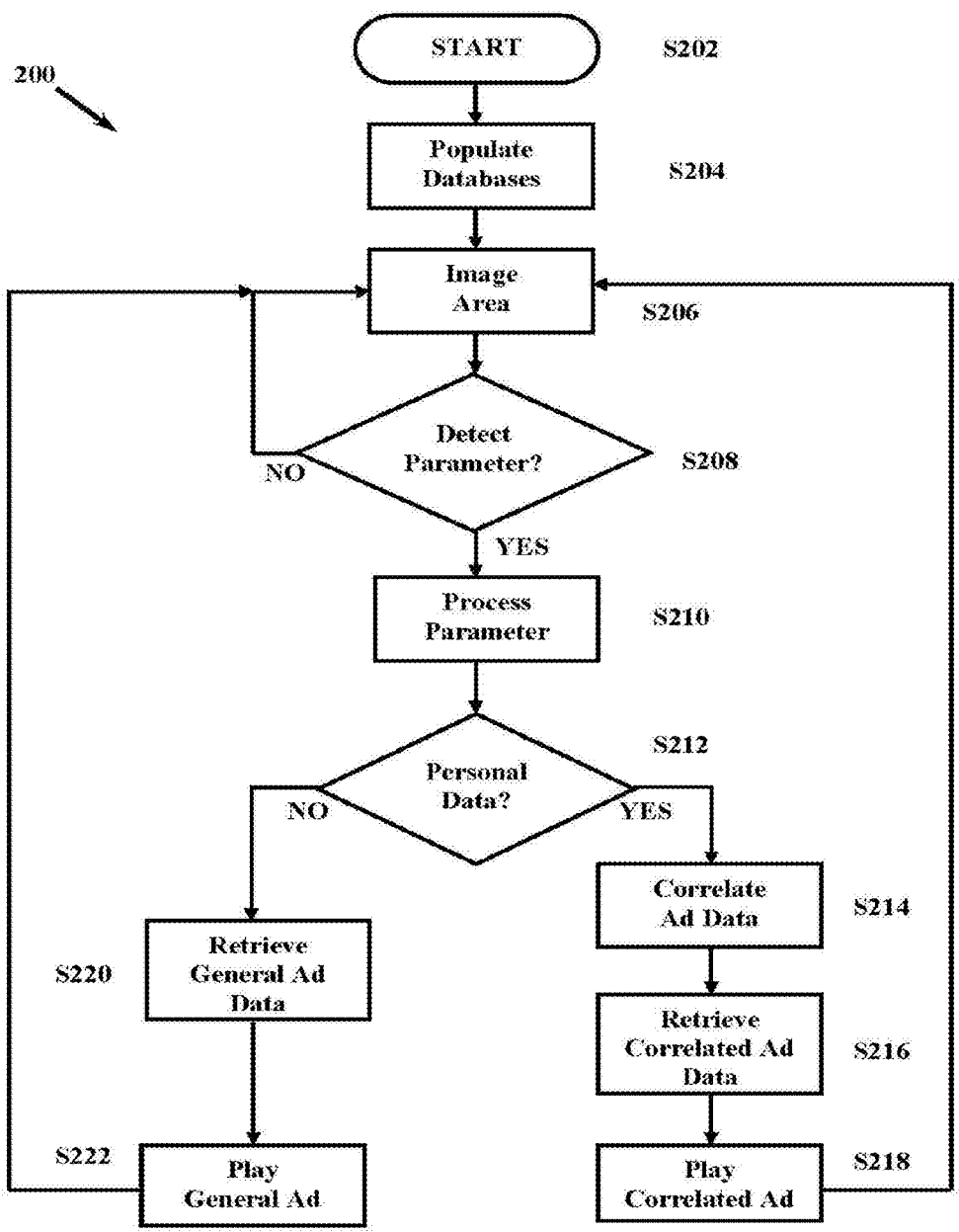
FIG. 2 illustrates an example method of operating a system in accordance with aspects of the present invention.

An example method 200 of operating a system in accordance with aspects of the present invention will now be described with reference to FIGS. 1 and 2.

When system 100 is started (S202), advertising database 102 and personal database 104 are populated (S204). Each of advertising database 102 and personal database 104 may be populated by any known method. Further, each may be updated continuously or at predetermined intervals.

Next, system 100 images an area (S206). Referring back to FIG. 1, sensor portion 114 may image an area. For example, sensor portion 114 may be a camera operable to image an area. The image of the area is then provided as area image data to processor communication portion 110 via target signal 132. Processor communication portion 110 provides the area image data to processor portion 106.

Next, it is determined whether a predetermined parameter is detected (S208). In one embodiment, processor portion 106 searches area image data for predetermined image data that corresponds to at least one of a plurality of predetermined parameters that may be used to identify a person or car within the imaged area. Non-limiting examples of predetermined parameters include vehicle types, vehicle models, license plates, bar codes and computer readable vehicle registration stickers. In one example, a predetermined parameter may be a license plate on a vehicle. Further, an imaged area may include the front of a vehicle, which includes a license plate. Additionally, in some embodiments, the imaged area may be an area that is searched for a specific signal within the electromagnetic spectrum that may be outside the optical spectrum. Non-limiting examples of specific signals within the electromagnetic spectrum that may be outside the optical spectrum include, infra-red, ultra violet and radio frequency signals. In this spectrum, example embodiments in accordance with the present invention may include, as sensor portion 114, a key fob or other hardware device with a built-in authentication system that is capable of transmitting an identifying code.

If a predetermined parameter is not detected, then system 100 continues to image the area (S206). If a predetermined parameter is detected, then system 100 processes the predetermined parameter (S210). In one embodiment, processor portion 106 converts the detected parameter into parameter data that is in a format, which is compatible with the format of personal content data 138 within personal database 104. In the example discussed above, presume that the parameter data is a seven digit alpha-numeric string corresponding to the license plate on the vehicle. In other examples, the format may be a code corresponding to a make and/or model of a vehicle.

Next, it is determined whether personal database 104 includes an entry in personal content data 138 corresponding to the detected predetermined parameter (S212). In one example, processor portion 106 instructs personal database 104, via signal 124, to search personal content data 138 for identifying data 146 corresponding to the seven digit alpha-numeric string, which corresponds to the license plate on the vehicle.

If personal database 104 includes personal data corresponding to the detected predetermined parameter, then system 100 correlates advertising data within advertising database 102 with the personal data corresponding to the detected predetermined parameter (S214). In the example discussed above, if personal database 104 indicates that personal content data 138 for identifying data 146 corresponding to the seven digit alpha-numeric string, which corresponds to the license plate on the vehicle, then personal database 104 sends the respective entry of correlation data 148 to processor portion 106 via signal 122. In this example, presume that the entry of correlation data 148 indicates that the owner of the vehicle having a license plate that corresponds to the imaged seven digit alpha-numeric string is interested in marathon running.

Next, system 100 retrieves the correlated advertising data from advertising database 102 (S216). In one embodiment, processor portion 106 sends correlation data 148 to advertising database 102 via signal 118. Advertising database 102 then uses correlation data 148 in conjunction with advertisement correlation data 144 to find a particular advertisement content data, within advertisement content data 140, and send the particular advertisement content data to processor portion via signal 120. In this example, presume that the advertisement correlation data, within advertisement correlation data 144, includes an entry and corresponds to running. In such a case, the correlation data within correlation data 148, which indicates that the owner of the vehicle having a license plate that corresponds to the imaged seven digit alpha-numeric string is interested in marathon running, would match with the entry in the advertisement correlation data that corresponds to running. Further, presume that the advertisement correlation data that corresponds to running, links to an advertisement content data, within advertisement content data 140, corresponding to an advertisement of a specific vendor for a particular running shoe. In such a case, advertising database 102 would then send the advertisement content data corresponding to an advertisement of a specific vendor for a particular running shoe to processor portion 106 via signal 120.

Next, system 100 plays the correlated advertisement corresponding to the correlated advertising data (S218). In one embodiment, processor portion 106 sends the advertisement content data corresponding to the advertisement of the specific vendor for the particular running shoe to processor communication portion 110 via signal 128. Processor communication portion 110 then sends the advertisement content data to display portion 116 to display the advertisement.

In some embodiments, display portion 116 may display all of the advertisement content data one time, irrespective of the length of the advertisement and irrespective of whether the vehicle that was detected by system 100 is still located such that the driver can see the advertisement.

In some embodiments, display portion 116 may display a portion of the advertisement content data. In some of these embodiments, the amount of the advertisement content data that is displayed is based on the amount of time the driver may see display portion 116. One specific example will now be described.

In one example embodiment, after display portion 116 has started displaying the advertisement (S218), but before the advertisement is completed, sensor portion 114 again images an area (S206). If the originally identified target, which in this example is a vehicle, is determined to still be in the area, then the advertisement will continue to play. However, in the case where the parameter is not detected (S208), which in this example means that the vehicle is no longer present, then display portion 116 may cease displaying the advertisement.

In other embodiments, wherein the amount of the advertisement content data that is displayed is based on the amount of time the driver may see display portion 116, the amount of time the driver may see display portion 116 is based on the relative position of the advertising vehicle and the driver's vehicle and/or the relative velocity of the advertising vehicle and the driver's vehicle. One specific example will now be described.

In one example embodiment, GPS portion 112 provides GPS signal 130 to processor communication portion 110, which may include position and velocity information of the advertising vehicle. For example, GPS portion 112 may be operable to obtain position information at two times and calculate a magnitude and direction of the velocity of the advertising vehicle. Further, in this example embodiment, sensor portion 114 is further operable to determine the velocity of the target vehicle, relative to the velocity of the advertising vehicle, e.g., via a Doppler radar system. Sensor portion 114 may provide velocity information of the target vehicle to processor communication portion 110 via target signal 132. Processor communication portion 110 may then provide the advertising vehicle's velocity information and the target vehicle velocity information to processor portion 106 via signal 126. Processor portion 106 may be further operable to determine a time, based on the position of the advertising vehicle and the relative velocity between the advertising vehicle and the target vehicle, with which the driver of the target vehicle will be likely able to view display portion 116. In such a case, processor portion may instruct display portion 116 to display the advertisement for only the amount of time the driver of the target vehicle will be likely able to view display portion 116.

In some embodiments, display portion 116 may display all of the advertisement content data more than one time. In some of these embodiments, the number of times the advertisement content data is displayed is based on the amount of time the driver may see display portion 116. One specific example will now be described.

In one example embodiment, after display portion 116 has completed displaying the advertisement (S218), sensor portion 114 again images an area (S206). If the originally identified target, which in this example is a vehicle, is determined to still be in the area, then the advertisement will be displayed again. However, in the case where the parameter is not detected (S208), which in this example means that the vehicle is no longer present, then display portion 116 may not display the advertisement.

In other embodiments, wherein the number of times the advertisement content data is displayed is based on the amount of time the driver may see display portion 116, the amount of time the driver may see display portion 116 is based on the relative position of the advertising vehicle and the driver's vehicle and/or the relative velocity of the advertising vehicle and the driver's vehicle. Two specific examples will now be described.

In one example embodiment, GPS portion 112 provides to processor communication portion 110 GPS signal 130, which may include position and velocity information of the advertising vehicle. For example, GPS portion 112 may be operable to obtain position information at two times and calculate a magnitude and direction of the velocity of the advertising vehicle. Further, in this example embodiment, sensor portion 114 is further operable to determine the velocity of the target vehicle, relative to the velocity of the advertising vehicle, e.g., via a Doppler radar system. Sensor portion 114 may provide velocity information of the target vehicle to processor communication portion 110 via target signal 132. Processor communication portion 110 may then provide the advertising vehicle's velocity information and the target vehicle velocity information to processor portion 106 via signal 126. Processor portion 106 may be further operable to determine a time, based on the position of the advertising vehicle and the relative velocity between the advertising vehicle and the target vehicle, with which the driver of the target vehicle will be likely able to view display portion 116. In such a case, processor portion may instruct display portion 116 to repeatedly display the advertisement for the amount of time the driver of the target vehicle will be likely able to view display portion 116.

In another example, sensor portion 114 includes a plurality of separate sensors and display portion 116 includes a plurality of separate displays. The plural sensors and displays are located to increase viewing time by a driver of any one particular vehicle. In one specific example, sensor portion 114 includes four separate sensors, wherein one is disposed at the rear of the advertising vehicle and facing behind the vehicle, one is disposed at the rear of the advertising vehicle and facing the side of the vehicle, one is disposed in the middle of the advertising vehicle and facing the side of the vehicle, and one is disposed at the front of the advertising vehicle and facing the side of the vehicle. Further, in this specific example, display portion 116 includes three separate displays, wherein one is disposed at the rear of the advertising vehicle and facing behind the vehicle, one is disposed on the rear half of the advertising vehicle and facing the side of the vehicle and one is disposed on the front half of the advertising vehicle and facing the side of the vehicle. With this embodiment, a person driving a target vehicle may view a particular advertisement a number of times from the different displays while passing the advertisement vehicle. This will be described in greater detail below.

In an exemplary embodiment the display may include a directional viewing system, non-limiting examples of which include lenticular or holographic displays, wherein one display may be operable to display different advertisements to multiple proximate vehicles looking at the display from different angles.

Returning to step S212, if personal database 104 does not include personal data corresponding to the detected predetermined parameter, then system 100 may not play an advertisement at all or may retrieve general advertising data from advertising database 102 (S220). There may be times when a parameter, for example a license plate on a vehicle, is recognized but the specific parameter, for example a license plate number ABC1234, is not registered in personal database 104. In such a case, processor portion may indicate a "miss" for correlation data 148 in signal 118 to advertising database 102. In some embodiments, advertising database may provide a general advertisement to be displayed by display portion in such cases. In specific embodiments, many vendors may provide such general advertisements for display, wherein a choice of which general advertisement to display may be made by any known method.

Next, system 100 plays the general advertisement corresponding to the general advertising data (S222). In some embodiments, advertising database 102 sends the advertisement content data, which in this example is a general advertisement, to processor portion via signal 120. Processor portion 106 then sends the advertisement content data to processor communication portion 110 via signal 128. Processor communication portion 110 then sends the advertisement content data to display portion 116 to display the general advertisement.

After playing the general advertisement, system 100 again images an area (S206).

Specific non-limiting working examples systems in accordance with aspects of the present invention will now be described with reference to FIGS. 3-8.

Figure 3:
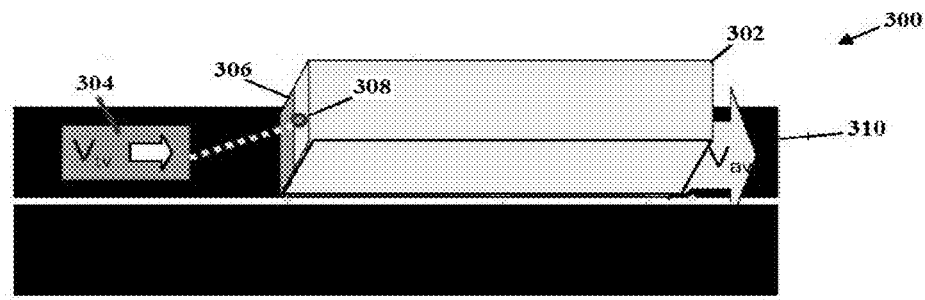
FIG. 3 illustrates an oblique view of a working example embodiment of a vehicle advertising system in accordance with the present invention.

FIG. 3 is an oblique view of a working example embodiment of a vehicle advertising system in accordance with the present invention. In the figure, advertising system 300 includes advertising vehicle 302. For the purpose of explaining operation of advertising system 300, assume in this example that advertising vehicle 302 is moving at a velocity $V_{av}$ along road 310. Additionally illustrated in the figure is a target vehicle 304. Assume in this example that target vehicle 304 is moving at a velocity $V_{tv}$ along road 310. Advertising vehicle 302 includes a display 306 corresponding to display portion 116 of FIG. 1, a license plate processing system 308 corresponding to sensor portion 114, processor communication portion 110 and processor portion 106 of FIG. 1. Advertising and personal data bases may be disposed within advertising vehicle 302 or may be remotely located. GPS portion 112 of FIG. 1, in this example, may be disposed within advertising vehicle 302.

In operation, advertising data 136 that may include advertisement content data 140, pricing data 142 and advertisement correlation data 144 would have been stored in an advertising database 102. Further, personal content data 138 that may include identifying data 146 and correlation data 148 would have been stored in personal database 104.

In this example, presume advertising vehicle 302 is located five miles west of a city Greenville and is moving in a direction east toward a city Blueville. Further presume, in this example, that at velocity $V_{av}$, advertising vehicle 302 should arrive at Blueville in two hours.

In this example, presume target vehicle 304 approaches advertising vehicle 302 at a velocity $V_{tv}$.

Next, the license plate of target vehicle 304 is imaged by license plate processing system 308, by any of the methods discussed earlier.

Next, the GPS portion of system 300, located within advertising vehicle 302, determines the current location and velocity of advertising vehicle 302. The license plate number and the GPS information may be relayed to processor portion 106 via processor communication portion 110.

Next, personal database 104 provides specific personal content data 138 to identity the operator of target vehicle 304.

Processor portion 106 may generate specific predictions based on known pre-programmed algorithms. Non-limiting examples of types of predictions include the likely origin of target vehicle 304, based on current location and velocity and the likely destination of target vehicle 304, based on current location and velocity. Processor portion 106 may additionally generate specific data based on known GPS data. Non-limiting examples of types of specific data based on known GPS data include: types and locations business and events located in the vicinity; types and locations business and events located in the likely origin of target vehicle 304 and types and locations business and events located in the likely destination of target vehicle 304. Based on the specific predictions and the specific data, processor portion 106 may determine the best advertisement to display to target vehicle 304.

If no information is located in personal database 104 about the license plate of target vehicle 304 then a general advertisement may be displayed on display 306.

If information is located in personal database 104 about the license plate of target vehicle 304 then a specific advertisement is determined based on a correlation between the information in personal database 104 and advertising database 102. The specific advertisement is retrieved and displayed on display 306.

In an example embodiment, if processor portion 106 determines, based on GPS signal 130 and target signal 132, that the driver of target vehicle 304 will only likely be able to view display 306 for 10 seconds, then an advertisement from advertising database 102 may be chosen accordingly. Similarly, if processor portion 106 determines, based on GPS signal 130 and target signal 132, that the driver of target vehicle 304 will likely be able to view display 306 for 45 seconds, then a longer advertisement from advertising database 102 may be chosen, or a series of advertisements may be chosen.

In one specific example, presume that target vehicle 304 is traveling along road 310 and processor portion 106 determines the license plate number via license plate processing system 308 and obtains personal data about the owner of target vehicle 304 via the personal database 104. Specifically, presume that processor portion 106 determines that the owner, and presumed driver, of target vehicle 304 frequents a particular fast food chain. The processor portion 106 may retrieve advertisements for that fast food chain from advertising database 102. Using information on GPS signal, processor portion may instruct display 306 to display the advertisements for that fast food chain in addition to data corresponding to directions to the nearest location, e.g., "Fast Food Chain A is two exits ahead, exit 455—exit the highway and take your first right."

In some embodiments, processor portion 106 may determine one or simultaneous multiple advertisements to be streamed via a tiered decision logic. In an example embodiment, advertisements may be are ordered by a weighted combination of parameters, non-limiting examples of which include amount of fee paid, current location of advertising vehicle 302, current velocity of advertising vehicle 302 and duration and size of sponsored advertisements which may be directly related to how long the driver of target vehicle 304 will be likely to view an advertisement. For example, presume that a first advertisement from a first sponsor has been selected for display on display 306 and this first advertisement is 22 seconds long. Presume in this example however that the time the driver of target vehicle 304 will be likely to view an advertisement is only 15 seconds. In such as case, processor portion 106 may chose a shorter advertisement by the first sponsor, or if none available, chose an advertisement that is less than 15 seconds from another sponsor.

Next, as target vehicle 304 begins to pass advertising vehicle 302, display 306 ceases to display the advertisement. License plate processing system 308 then continues to scan for the next approaching target vehicle, at which time the process begins again.

Figure 4:
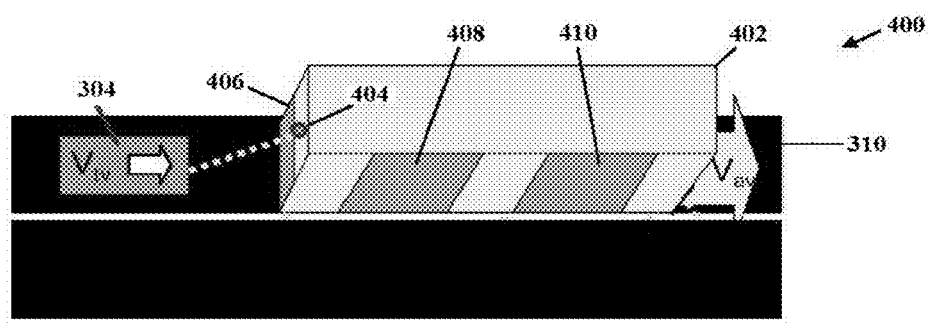
FIG. 4 illustrates an oblique view of another working example embodiment of a vehicle advertising system in accordance with the present invention.

FIG. 4 is an oblique view of another working example embodiment of a vehicle advertising system 400 in accordance with the present invention. In the figure, vehicle advertising system 400 includes advertising vehicle 402. For the purpose of explaining operation of vehicle advertising system 400, assume in this example that advertising vehicle 402 is moving at a velocity $V_{av}$ along road 310. Additionally illustrated in the figure is a target vehicle 304. Assume in this example that advertising vehicle 402 is moving at a velocity $V_{tv}$ along road 310. Advertising vehicle 402 includes a display 406, a display 408 and a display 410, the three of which correspond to display portion 116 of FIG. 1. Advertising vehicle 402 additionally includes a license plate processing system 404 corresponding to sensor portion 114, processor communication portion 110 and processor portion 106 of FIG. 1. Advertising and personal data bases may be disposed within advertising vehicle 402 or may be remotely located. GPS portion 112 of FIG. 1, in this example, may be disposed within advertising vehicle 402. Further, similar to advertising vehicle 302 discussed above with reference to FIG. 3, processing equipment and databases are disposed within advertising vehicle 402.

Advertising vehicle 402 differs from advertising vehicle 302 discussed above with reference to FIG. 3 in that license plate processing system 404 of advertising vehicle 402 is operable to provide information to determine a current position and velocity target vehicle in relation to display 406, display 408 and display 410. With additional reference to FIG. 2, in vehicle advertising system 400, step S218 is based on the velocity of target vehicle 304, as will be described in more detail below.

Processor portion 106 may generate specific predictions based on known pre-programmed algorithms, as discussed above with respect to the FIG. 3. Processor portion 106 may additionally generate specific data based on known GPS data, as discussed above with respect to the FIG. 3. Based on the specific predictions and the specific data, processor portion 106 may determine the best advertisement to display to target vehicle 304. Further, processor portion 106 may determine the velocity of target vehicle 304 and the velocity of advertising vehicle 402 based on a combination of GPS data and information from license plate processing system 404. As such, the amount of time the driver of target vehicle 304 will likely be able to view an advertisement on displays 406, 408 and 410 may additionally be determined. Accordingly, processor portion 106 may be operable to instruct displays 406, 408 and 410 to display an advertisement in such a manner to correspond to the velocity of target vehicle 304, wherein a driver of target vehicle 304 will likely be able to view the advertisement on at least one of displays 406, 408 and 410.

As target vehicle 304 begins to pass advertising vehicle 402, display 406 ceases to display the advertisement, display 408 begins to display the advertisement and license plate processing system 404 then continues to scan for the next approaching target vehicle, at which time the process begins again.

Processor portion 106 is operable to determine, based on the relative velocity and position of target vehicle 304, as determined by GPS, license plate processing system 404 and processor portion 106, when to cease displaying the advertisement on display 408 and to begin displaying the advertisement on display 410. Accordingly, in accordance with this example embodiment, the time with which the driver of target vehicle 304 will likely be able to view the advertisement is greatly increased over the examples discussed above with respect to FIG. 3. In particular, the driver of target vehicle 304, in accordance with this example embodiment, will likely be able to view the advertisement while he drives behind, and all along the side of advertising vehicle 402.

Figure 5:
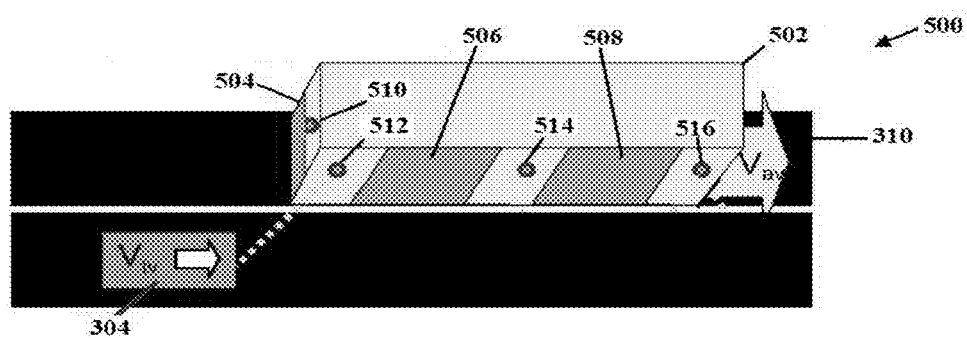
FIG. 5 illustrates an oblique view of another working example embodiment of a vehicle advertising system in accordance with the present invention.

FIG. 5 is an oblique view of another working example embodiment of a vehicle advertising system 500 in accordance with the present invention. In the figure, vehicle advertising system 500 includes advertising vehicle 502. For the purpose of explaining operation of vehicle advertising system 500, assume in this example that advertising vehicle 502 is moving at a velocity $V_{av}$ along road 310. Additionally illustrated in the figure is target vehicle 304. Assume in this example that target vehicle 304 is moving at a velocity $V_{tv}$ along road 310. Advertising vehicle 502 includes a display 504, a display 506 and a display 508, the three of which correspond to display portion 116 of FIG. 1. Advertising vehicle 402 additionally includes a license plate processing system 510, a license plate processing system 512, a license plate processing system 514 and a license plate processing system 516, the group of four of which correspond to sensor portion 114, processor communication portion 110 and processor portion 106 of FIG. 1. Advertising and personal data bases may be disposed within advertising vehicle 502 or may be remotely located. GPS portion 112 of FIG. 1, in this example, may be disposed within advertising vehicle 502. Further, similar to advertising vehicle 302 discussed above with reference to FIG. 3, processing equipment and databases are disposed within advertising vehicle 502.

Advertising vehicle 502 differs from advertising vehicle 402 discussed above with reference to FIG. 4 in that license plate processing system 510, license plate processing system 512, license plate processing system 514 and license plate processing system 516 of advertising vehicle 502 are operable to provide additional information to more accurately determine a current position and velocity target vehicle in relation to display 504, display 506 and display 508. With additional reference to FIG. 2, in vehicle advertising system 500, steps S206-S218 take into account, each of license plate processing system 510, a license plate processing system 512, a license plate processing system 514 and a license plate processing system 516, as will be described in more detail below.

Processor portion 106 may generate specific predictions based on known pre-programmed algorithms, as discussed above with respect to the FIG. 3. Processor portion 106 may additionally generate specific data based on known GPS data, as discussed above with respect to the FIG. 3. Based on the specific predictions and the specific data, processor portion 106 may determine the best advertisement to display to target vehicle 304. Further, processor portion 106 may determine the velocity of target vehicle 304 and the velocity of advertising vehicle 502 based on a combination of GPS data and information from license plate processing system 510, license plate processing system 512, license plate processing system 514 and license plate processing system 516. As such, the amount of time the driver of target vehicle 304 will likely be able to view an advertisement on displays 504, 506 and 508 may additionally be determined. Accordingly, processor portion 106 may be operable to instruct displays 504, 506 and 508 to display an advertisement in such a manner to correspond to the velocity of target vehicle 304, wherein a driver of target vehicle 304 will likely be able to view the advertisement on at least one of displays 504, 506 and 508.

As target vehicle 304 begins to pass advertising vehicle 502, display 504 ceases to display the advertisement. Then, license plate processing system 512 detects target vehicle 304 and enables display 506 to display the advertisement. As target vehicle 304 continues along the side of advertising vehicle 502, license plate processing system 514 detects target vehicle 304. Processor portion 106 is operable to determine, based on the relative velocity and position of target vehicle 304, as determined by GPS, license plate processing system 514 and processor portion 106, when to cease displaying the advertisement on display 506 and to begin displaying the advertisement on display 508.

As target vehicle 304 continues further along the side of advertising vehicle 502, license plate processing system 516 detects target vehicle 304. Processor portion 106 is operable to determine, based on the relative velocity and position of target vehicle 304, as determined by GPS, license plate processing system 516 and processor portion 106, when to cease displaying the advertisement on display 508. Accordingly, similar to the example discussed above with reference to FIG. 4, in accordance with this example embodiment, the time with which the driver of target vehicle 304 will likely be able to view the advertisement is greatly increased over the examples discussed above with respect to FIG. 3.

Figure 6:
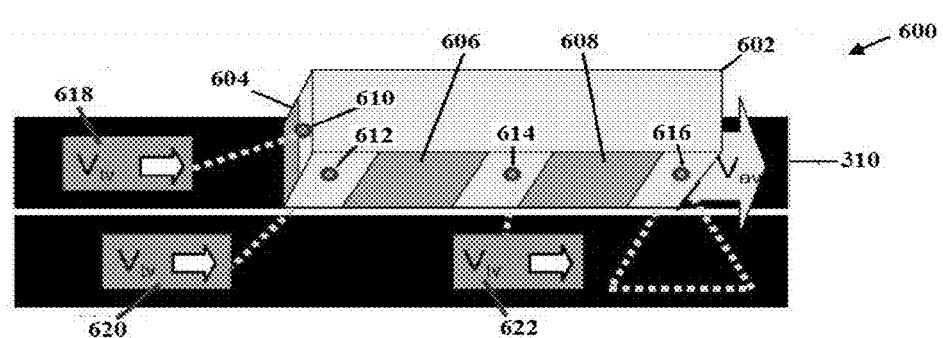
FIG. 6 illustrates an oblique view of another working example embodiment of a vehicle advertising system in accordance with the present invention.

FIG. 6 is an oblique view of another working example embodiment of a vehicle advertising system 600 in accordance with the present invention. In the figure, vehicle advertising system 600 includes advertising vehicle 602. For the purpose of explaining operation of vehicle advertising system 600, assume in this example that advertising vehicle 602 is moving at a velocity $V_{av}$ along road 310. Additionally illustrated in the figure is a target vehicle 618, a target vehicle 620 and a target vehicle 622. Assume in this example that target vehicle 618 is moving at a velocity $V_{tv1}$ along road 310, target vehicle 620 is moving at a velocity $V_{tv2}$ along road 310 and target vehicle 622 is moving at a velocity $V_{tv3}$ along road 310. Advertising vehicle 602 includes a display 604, a display 606 and a display 608, the three of which correspond to display portion 116 of FIG. 1. Advertising vehicle 602 additionally includes a license plate processing system 610, a license plate processing system 612, a license plate processing system 614 and a license plate processing system 616, the group of four which correspond to sensor portion 114, processor communication portion 110 and processor portion 106 of FIG. 1. Advertising and personal data bases may be disposed within advertising vehicle 602 or may be remotely located. GPS portion 112 of FIG. 1, in this example, may be disposed within advertising vehicle 602. Further, similar to advertising vehicle 302 discussed above with reference to FIG. 3, processing equipment and databases are disposed within advertising vehicle 602.

Advertising vehicle 602 differs from advertising vehicle 502 discussed above with reference to FIG. 5 in that license plate processing system 610, license plate processing system 612, license plate processing system 614 and license plate processing system 616 of advertising vehicle 602 are operable to provide information to determine a current position and velocity of different target vehicles, respectively, in relation to display 604, display 606 and display 608, as will be described in more detail below.

Each of license plate processing system 610, license plate processing system 612, license plate processing system 614 and license plate processing system 616 of advertising vehicle 602 is operable to image a target and provide GPS data in a manner similar to license plate processing system 308, as discussed above with respect to FIG. 3. Further, processor portion 106 is operable to process information, to enable correlation between a specific advertisement to be displayed, on at least one of displays 604, 606 and 608, for each of target vehicles 618, 620 and 622.

Processor portion 106 may generate specific predictions for each of target vehicles 618, 620 and 622, based on known pre-programmed algorithms, as discussed above with respect to the FIG. 3. Processor portion 106 may additionally generate specific data based on known GPS data for each of target vehicles 618, 620 and 622, as discussed above with respect to the FIG. 3. Based on the specific predictions and the specific data, processor portion 106 may determine the best advertisement to display to each of target vehicles 618, 620 and 622. Further, processor portion 106 may determine the velocity of each of target vehicles 618, 620 and 622 and the velocity of advertising vehicle 502 based on a combination of GPS data and information from license plate processing system 610, license plate processing system 612, license plate processing system 614 and license plate processing system 616. As such, the amount of time the drivers of each of target vehicles 618, 620 and 622, respectively, will likely be able to view an advertisement on displays 604, 606 and 608 may additionally be determined.

Figure 7:
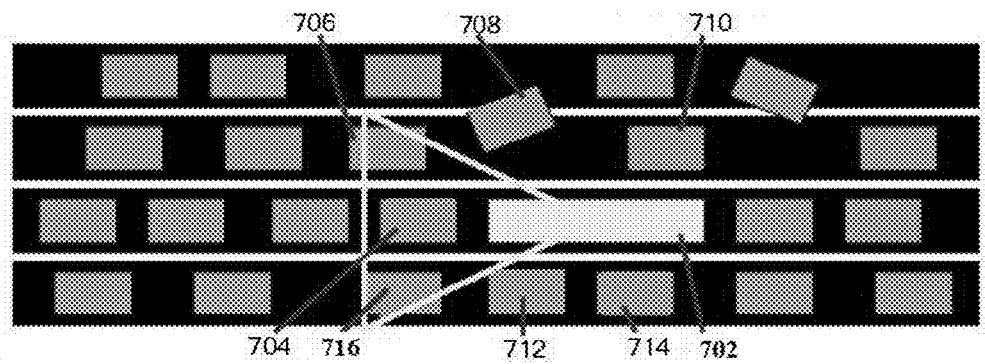
FIG. 7 illustrates a plan view of a targeted vehicle advertising and entertainment system in traffic in accordance with the present invention.

FIG. 7 illustrates a plan view of advertising vehicle 702 and multiple target vehicles 702, 704, 706, 708, 710, 712 and 714 in traffic. Advertising vehicle 702 includes a plurality of displays on the rear, and both sides that enable viewing by target vehicles 704, 706, 708, 710, 712 and 714. FIG. 7 also shows other vehicles, not numbered, that may become targeted for view of advertisements on displays.

Figure 8:
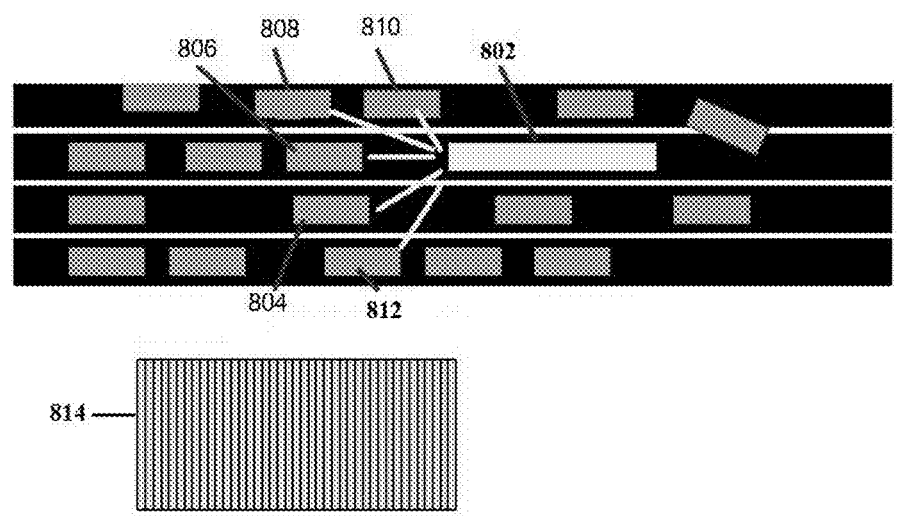
FIG. 8 illustrates a plan view of another targeted vehicle advertising and entertainment system in traffic in accordance with the present invention.

FIG. 8 illustrates a plan view of another working example embodiment of a vehicle advertising system in accordance with the present invention. In the figure, an advertising system includes advertising vehicle 802. Vehicle 802 differs somewhat from vehicle 302 of FIG. 3 in that display 306 is replaced by a lenticular display 814. Further, the license plate processing system (not shown) of vehicle 802 is operable to process a plurality of vehicles and determine the direction with which the respective drives would likely view lenticular display 814. With this type of display, a plurality of different advertisements may be displayed to a plurality of respective drivers, based on the angle of view. Other angle-based viewing technologies may be used for such a display, non-limiting examples of which include holographic displays.

Example embodiments discussed above describe displaying an advertisement to a vehicle driver. In other example embodiments, other video content may be displayed for entertainment purposes, non-limiting examples of which include motion pictures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method of providing advertising to a target vehicle, said method comprising:

detecting, by at least one sensor device coupled to an advertising vehicle that is moving, a parameter, wherein the parameter is associated with the target vehicle while the target vehicle is moving and is in a vicinity of the advertising vehicle;

receiving, by at least one processor in communication with the at least one sensor device and a global positioning system (GPS) device, the detected parameter;

said at least one processor matching the detected parameter to data in a personal database, said matching the detected parameter comprising determining identification data associated with the detected parameter;

said at least one processor matching the determined identification data to advertising correlation data in an advertising database, said matching the determined identification data comprising determining a topic associated with the identification data;

said at least one processor obtaining, from the advertising database, advertising content data that pertains to the determined topic;

determining, by the at least one sensor device and/or the GPS device in the advertising vehicle, vehicle data selected from the group consisting of a relative velocity of the advertising vehicle with respect to a velocity of the target vehicle, a relative position of the advertising vehicle with respect to a position of the target vehicle, and a combination thereof;

said at least one processor receiving the vehicle data; and said at least one processor initiating display of the advertising content data on a display device in the advertising vehicle to display the advertising content data to the target vehicle in accordance with at least one display parameter that is based on the received vehicle data.

2. The method of claim 1, wherein the method further comprises said at least one processor initiating display of, on the display device, different data of the advertising content data to different vehicles viewing the display device from different angles.

3. The method of claim 1, wherein the at least one sensor device comprises a camera that detects the parameter.

4. The method of claim 1, wherein the detected parameter is a license plate number of the target vehicle, and wherein the identification data identifies an owner of the target vehicle.

5. The method of claim 1, wherein the detected parameter includes content detected by the at least one sensor device from a registration sticker on the target vehicle, and wherein the identification data identifies an owner of the target vehicle.

6. A system, comprising:

a physically tangible storage medium storing computer readable program code;

a display device in an advertising vehicle that is moving;

at least one sensor device coupled to the advertising vehicle;

a global positioning system (GPS) device in the advertising vehicle; and at least one processor in communication with the at least one sensor device and the GPS device, wherein the at least one processor is configured to execute the program code to perform a method of providing advertising to a target vehicle, said method comprising:

detecting, by the at least one sensor device, a parameter, wherein the parameter is associated with the target vehicle while the target vehicle is moving and is in a vicinity of the advertising vehicle;

said at least one processor receiving the detected parameter;

said at least one processor matching the detected parameter to data in a personal database, said matching the detected parameter comprising determining identification data associated with the detected parameter;

said at least one processor matching the determined identification data to advertising correlation data in an advertising database, said matching the determined identification data comprising determining a topic associated with the identification data;

said at least one processor obtaining, from the advertising database, advertising content data that pertains to the determined topic;

determining, by the at least one sensor device and/or the GPS device, vehicle data selected from the group consisting of a relative velocity of the advertising vehicle with respect to a velocity of the target vehicle, a relative position of the advertising vehicle with respect to a position of the target vehicle, and a combination thereof;

said at least one processor receiving the vehicle data; and said at least one processor initiating display of the advertising content data on the display device to display the advertising content data to the target vehicle in accordance with at least one display parameter that is based on the received vehicle data.

7. The system of claim 6, wherein the advertising database and the personal database are both within the advertising vehicle.

8. The system of claim 6, wherein the advertising database and the personal database are located external to the advertising vehicle.

9. The system of claim 6, wherein the method further comprises said at least one processor initiating display of, on the display device, different data of the advertising content data to different vehicles viewing the display device from different angles.

10. The system of claim 6, wherein the detected parameter includes content detected by the at least one sensor device from a registration sticker on the target vehicle, and wherein the identification data identifies an owner of the target vehicle.

11. A computer program product, comprising:

a physically tangible storage medium storing computer readable program code configured to be executed by at least one processor to implement a method for providing advertising to a target vehicle, said storage medium not being a signal, said method comprising:

detecting, by at least one sensor device coupled to an advertising vehicle that is moving, a parameter, wherein the parameter is associated with the target vehicle while the target vehicle is moving and is in a vicinity of the advertising vehicle;

said at least one processor in communication with the at least one sensor device and a global positioning system (GPS) device receiving the detected parameter;

said at least one processor matching the detected parameter to data in a personal database, said matching the detected parameter comprising determining identification data associated with the detected parameter;

said at least one processor matching the determined identification data to advertising correlation data in an advertising database, said matching the determined identification data comprising determining a topic associated with the identification data;

said at least one processor obtaining, from the advertising database, advertising content data that pertains to the determined topic;

determining, by the at least one sensor device and/or the GPS device in the advertising vehicle, vehicle data selected from the group consisting of a relative velocity of the advertising vehicle with respect to a velocity of the target vehicle, a relative position of the advertising vehicle with respect to a position of the target vehicle, and a combination thereof;

said at least one processor receiving the vehicle data; and said at least one processor initiating display of the advertising content data on a display device in the advertising vehicle to display the advertising content data to the target vehicle in accordance with at least one display parameter that is based on the received vehicle data.

12. The computer program product of claim 11, wherein the advertising database and the personal database are both within the advertising vehicle.

13. The computer program product of claim 11, wherein the advertising database and the personal database are located external to the advertising vehicle.

14. The computer program product of claim 11, wherein the method further comprises said at least one processor initiating display of, on the display device, different data of the advertising content data to different vehicles viewing the display device from different angles.

15. The computer program product of claim 11, wherein the detected parameter includes content detected by the at least one sensor device from a registration sticker on the target vehicle, and wherein the identification data identifies an owner of the target vehicle.

16. The method of claim 1, wherein the at least one display parameter comprises a total amount of data in the displayed advertising content data, wherein the vehicle data comprises the relative velocity, and wherein the total amount of data in the displayed advertising content data is based on the relative velocity.

17. The method of claim 1, wherein the at least one display parameter comprises a total amount of data in the displayed advertising content data, wherein the vehicle data comprises the relative position, and wherein the total amount of data in the displayed advertising content data is based on the relative position.

18. The system of claim 6, wherein the at least one display parameter comprises a total number of times the advertising content data is displayed, wherein the vehicle data comprises the relative velocity, and wherein the total number of times the advertising content data is displayed is based on the relative velocity.

19. The system of claim 6, wherein the at least one display parameter comprises a total number of times the advertising content data is displayed, wherein the vehicle data comprises the relative position, and wherein the total number of times the advertising content data is displayed is based on the relative position.

20. The computer program product of claim 11, wherein the at least one display parameter comprises a total time during which the advertising content data is displayed, wherein the vehicle data comprises the relative velocity, and wherein the total time during which the advertising content data is displayed is based on the relative velocity.

* * * * *